United States Patent [19]

Taniguchi et al.

[11] Patent Number: 5,038,287

[45] Date of Patent: Aug. 6, 1991

[54] METHOD OF CONTROLLING ENGINE IN VEHICLE FOR SPEED STAGE SHIFTING OF TRANSMISSION

[75] Inventors: Hiroji Taniguchi; Kunihiro Iwatsuki, both of Toyota, Japan

[73] Assignee: Toyota Jidosha Kabushiki Kaisha, Aichi, Japan

[21] Appl. No.: 491,162

[22] Filed: Mar. 9, 1990

[30] Foreign Application Priority Data

Jun. 2, 1989 [JP] Japan ................................. 1-140653

[51] Int. Cl.$^5$ ..................... G06F 15/50; G06F 7/70; B60K 41/04; B60K 41/10
[52] U.S. Cl. ........................... 364/424.1; 364/431.01; 74/858; 74/866; 74/851
[58] Field of Search ............... 364/431.04, 431.01, 364/424.1, 431.07, 431.08; 74/851, 852, 861, 866, 856, 857, 858

[56] References Cited

U.S. PATENT DOCUMENTS 4,266,447 5/1981 Heess et al. .
4,355,550 10/1982 Will et al. .
4,370,903 2/1983 Stroh et al. .
4,403,527 9/1983 Mohl et al. .
4,819,187 4/1989 Yasue et al. .

FOREIGN PATENT DOCUMENTS

150837 7/1986 Japan .
253229 11/1986 Japan .
265039 11/1987 Japan .
279144 12/1987 Japan .

*Primary Examiner*—Parshotam S. Lall
*Assistant Examiner*—Edward J. Pipala
*Attorney, Agent, or Firm*—Oliff & Berridge

[57] ABSTRACT

In controlling an internal combustion engine so as to temporarily decrease output torque thereof in relation to speed stage shifting of an automatic transmission connected therewith, input rotational speed of the automatic transmission is monitored so as to obtain first and second subsequent time points corresponding to traversing of first and second predetermined values of the input rotational speed along with change thereof due to the speed stage shifting of the transmission, and a control for decreasing engine output torque is triggered at the first time point, while the cancellation of the decreasing of engine output torque is triggered at a time point which is counted by a timer starting from the second time point.

4 Claims, 5 Drawing Sheets

METHOD OF CONTROLLING ENGINE IN VEHICLE FOR SPEED STAGE SHIFTING OF TRANSMISSION

BACKGROUND OF THE INVENTION

1. Field of the Invention

The present invention relates generally to the art of automatic transmissions for vehicles but more particularly rather to controlling an internal combustion engine in a vehicle in relation to control of the automatic transmission.

2. Description of the Prior Art

It is already known to control the vehicle's internal combustion engine in relation to the speed stage shifting control of the automatic transmission in various ways such that the engine output torque is temporarily lowered during the speed stage shifting of the automatic transmission for the purpose of improving smoothness of speed stage shifting of the automatic transmission, as described in Japanese Patent Laying-open Publications 61-112850, 61-150837, 61-253229, 62-265039 and 62-279144 and U.S. Pat. Nos. 4,266,447, 4,355,550, 4,370,903, 4,403,527 and 4,819,187. An essential matter in the art of temporarily decreasing the engine output torque during the speed stage shifting of the automatic transmission in which a certain first selective torque transmitting means, such as a clutch or a brake in the automatic transmission, is disengaged while a certain second selectively torque transmitting means is newly engaged, is the timing of decreasing and regaining the engine output torque in relation to the engagement of said second selectively torque transmitting means. If the timing of decreasing the enging output torque is too late in this respect, the effect of temporarily decreasing the engine output torque is not well exhibited, whereas if the timing of regaining the engine output torque is too early, the effect of temporarily decreasing the engine output torque is much reduced.

Taking a downshifting from a certain higher speed stage to a certain lower speed stage for an example of the speed stage shifting of the automatic transmission, the input rotational speed of the transmission gradually increases from a first rotational speed corresponding to the gear ratio of said certain higher speed stage, starting at a time point at which the selective torque transmitting means which had been engaged to provide said certain higher speed stage was virtually disengaged, to a second rotational speed corresponding to the gear ratio of said certain lower speed stage provided that the vehicle continues to run at a substantially constant speed. Therefore, it is theoretically possible to obtain the time point at which the selective torque transmitting means to set up said certain lower speed stage is virtually engaged by monitoring the input rotational speed of the transmission by means of a certain conventional speed sensor. For the convenience of clarity of analysis, if the selective torque transmitting means which is engaged to set up said certain lower speed stage is a one way clutch, such a time point at which the selective torque transmitting means for said certain lower speed stage is virtually engaged will be more distinctly conceived as a time point at which the input rotational speed of the transmission has just increased as much as a ratio corresponding to the ratio of the reduction gear ratio of said certain lower speed stage to the reduction gear ratio of said certain higher speed stage. However, even in the case of a one way clutch, it is not possible, as a matter of practice, to obtain the time point at which the one way clutch is engaged immediately at the instant of engagement by a monitoring of the input rotational speed of the transmission, because even as a matter of logic a certain time lapse is required to confirm that said rotational speed which had been gradually increasing has now stopped increasing.

On the other hand, a convenient method of temporarily decreasing the engine output torque is, in the case of a gasoline engine, to delay the spark timing. According to this method, the engine output torque can be decreased at a relatively high level of responsiveness. However, when the engine operation is controlled by a microcomputer system as in many modern automobiles, since the central processing unit must carry out various computations in succession, there is a certain time lapse before the spark timing is virtually delayed from the time point at which the spark timing delay is instructed to the microcomputer engine control system.

Because of the above situation it was a conventional art of temporarily decreasing the engine output torque during the speed stage shifting of the automatic transmission to monitor the input rotational speed of the transmission so as to obtain a time point at which the input rotational speed of the transmission traverses a certain predetermined value which is as much as a certain difference in advance of the final input rotational speed of the transmission expected to be attained when the speed stage shifting has been completed, to generate a signal for instructing the microcomputer engine control system of delaying the spark timing as much as an amount which has been calculated in the meantime after the speed stage shifting was started, then to maintain the delay of spark timing for a certain determinate period, and then to cancel the delay of spark timing to regain the engine output torque.

Figure 1:
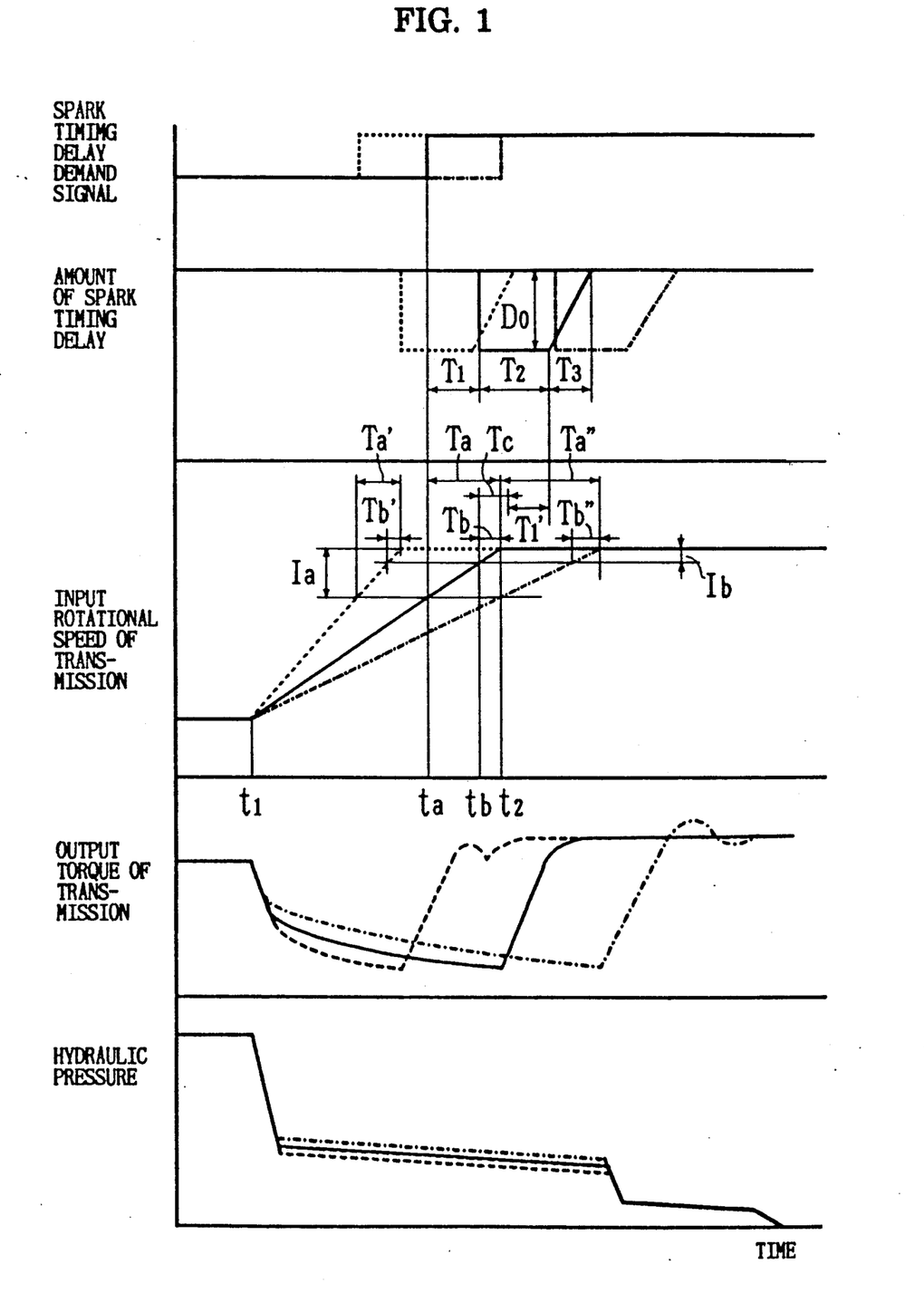
FIG. 1 is a diagram showing the performances of the spark timing delay demand signal, the amount of spark timing delay, the input rotational speed of the automatic transmission, the output torque of the automatic transmission, and the hydraulic pressure in the selective torque transmitting means to be disengaged for the speed stage shifting relative to a common scale of time lapse.

Such an art is illustrated in FIG. 1 of the accompanying drawings, in which on and off of spark timing delay demand signal, carrying out of the spark timing delay with its calculated amount, input rotational speed of the transmission, output torque of the transmission, and hydraulic pressure for actuating the selective torque transmitting means to be disengaged for the speed stage shifting are shown in relation to a common time scale with respect to an example of downshifting from a certain higher speed stage to a certain lower speed stage in which a one way clutch is automatically engaged in exchange with disengagement of a hydraulically operated selective torque transmitting means.

Referring to FIG. 1, as the hydraulic pressure in the selective torque transmitting means is exhausted as shown by a solid line with an accompanying decrease of the output torque of the transmission also shown by a solid line, at time point $t_1$ the input rotational speed of the transmission starts to increase as shown by a solid line. According to this process, it is theoretically expected that at time point $t_2$ the one way clutch engages and the rotational speed of the input shaft stops increasing. According to the conventional method, the input rotational speed of the transmission is monitored to obtain a time point $t_a$ corresponding to a certain input rotational speed of the transmission which is as much as a difference Ia in rotational speed in advance of the input rotational speed of the transmission which is expected to be attained when the speed stage shifting was completed, provided that the vehicle continues to run at a constant speed for the time being. When the time point $t_a$ was obtained, a signal for instructing the microcomputer engine control system to delay the spark timing is generated, and after a certain time delay $T_1$ the delay in spark timing is virtually started to be maintained for a certain period $T_2$, and then the amount of spark timing delay is gradually decreased over time period $T_3$.

It is possible to obtain the time point $t_a$ instantly when the input rotational speed of the transmission monitored by a rotational speed sensor traversed the corresponding certain value. Therefore, by appropriately determining the amounts of $I_a$, $T_1$, $T_2$ and $T_3$, although the amount of $T_1$ cannot be smaller than a certain minimum amount, a high quality speed stage shifting of the automatic transmission would be available as supported by a temporary decrease of engine output torque at good timing.

However, it is in fact unavoidable that the exhausting of hydraulic pressure from the selective torque transmitting means fluctuates as shown by a broken line or a dot dash line in FIG. 1 according to hydraulic fluid temperature, manufacturing allowance of the hydraulic system, etc. If the hydraulic pressure is exhausted along the broken line, the input rotational speed of the transmission will increase along a broken line therefor, whereas if the hydraulic pressure is exhausted along the dot dash line, the input rotational speed of the transmission will increase along a dot dash line therefor. When the input rotational speed of the transmission increases along the broken line, the time duration Ta for advancing the time point $t_a$ relative to the time point $t_2$ is shortened to Ta', whereas if the rotational speed of the transmission increases along the dot dash line the time duration Ta is elongated to Ta". The difference between Ta and Ta' or between Ta and Ta" is greater as the advancing difference in rotational speed Ia is greater. However, a certain substantial amount is required for Ia in order to ensure a certain required minimum amount for $T_1$ as described above. When the spark timing delay demand signal is dispatched later than required relative to the time point of completion of the speed stage shifting, i.e., the engagement of the one clutch according to the present example, due to the shortening of the time duration Ta to Ta', the temporary decrease of the engine output torque occurs too late relative to the completion of the speed stage shifting, i.e. the engagement of the one way clutch in the present example, and therefore the output torque of the transmission will fluctuate as shown by a broken line in the diagram therefor, whereas when the spark timing delay demand signal is dispatched earlier than desired due to the elongation of Ta to Ta", the temporary decrease of the engine output torque will end too soon, and therefore the output torque will fluctuate as shown by the dot dash line in the diagram.

SUMMARY OF THE INVENTION

In consideration of the above-mentioned problems inherent to the method of controlling the engine output torque for the speed stage shifting of the automatic transmission based upon the monitoring of the rotational speed of the engine or the input member of the automatic transmission, it is the object of the present invention to solve such problems and to provide an improved method of controlling the engine for the speed stage shifting of the automatic transmission always at a good timing regardless of variations in the exhausting of the hydraulic pressure from the selective torque transmitting means which is disengaged for the speed stage shifting.

According to the present invention, the above-mentioned object is accomplished by a method of controlling an internal combustion engine in a vehicle in relation to a control of an automatic transmission in the vehicle, comprising the steps, when said automatic transmission is shifted between two speed stages, of: monitoring input rotational speed of said automatic transmission so as to detect first and second values thereof along with change of said input rotational speed due to the speed stage shifting of said automatic transmission so as to dispatch first and second signals corresponding to traversing of said first and second values, respectively; starting a first control operation for the engine to decrease output torque thereof in response to said first signal; starting a time counting in response to said second signal; and starting a second control operation for the engine when said time counting has lapsed to regain the output torque thereof by cancelling the decrease of output torque thereof due to said first control operation.

According to the above-mentioned method of the present invention, when viewed in FIG. 1, the spark timing delay demand signal is dispatched at a time point, i.e. $t_a$, when it was monitored that the input rotational speed of the automatic transmission traversed said first predetermined value thereof which is as much as a difference Ia less than the final value thereof expected to be attained at the completion of the speed stage shifting so that the delay of spark timing is virtually started after the lapse of $T_1$, but the duration of maintaining the delay of spark timing is counted by a timer to be a determinate period Tc plus a delay time $T_1'$ which is again required for the microcomputer engine control system to virtually start cancellation of the spark timing delay starting from a second time point, i.e. $t_b$, at which the input rotational speed of the automatic transmission is as much as a difference Ib less than the final value thereof expected to be attained at the completion of the speed stage shifting, Ib being of course smaller than Ia, and after the lapse of $Tc+T_1'$ the regaining of the engine output torque by cancellation of the delay of spark timing is started. As the time point $t_a$ determines only the start of the delay of spark timing with a certain time lapse such as $T_1$, the difference Ia in the input rotational speed of the automatic transmission may be selected to be small enough to provide the time point $t_a$ which is early enough to let the delay of spark timing virtually start early enough before the selective torque transmitting means to be engaged for the speed stage shifting, i.e. the one way clutch in the present example, comes into its virtual engagement, even when the input rotational speed of the automatic transmission increases relatively rapidly as shown by the broken line, while on the other hand, as the time point at which the cancellation of the delay of spark timing starts is determined as a time point which is the lapse of $Tc+T_1'$ from said second time point, i.e. $t_b$, corresponding to the input rotational speed of the automatic transmission in advance of its final value at the completion of the speed stage shifting as much as a smaller difference Ib, it is ensured that the cancellation of the spark timing delay is started within a small difference from a certain design time point determined to be most desirable relative to the time point $t_2$, because the time lapse Tb from the time point $t_b$ to the time point $t_2$ fluctuates to be Tb' or Tb" according to the fluctuations in the increasing rate of the input rotational speed of the automatic transmission as shown by the broken line or the dot dash line only within such a small extent which is approximately proportional to a ratio of Ib/Ia.

Therefore, according to the present invention, said first predetermined value of said input rotational speed is selected to provide said first signal early enough to allow said first control operation to bring about a substantial decrease of the engine output torque before the speed stage shifting is completed in spite of probable fluctuations in a rate of change of said input rotational speed due to the speed stage shifting.

Further, according to the present invention, therefore, said second predetermined value of said input rotational speed should desirably be selected to be substantially different from said first predetermined value and to be closer to a final value of said input rotational speed which is attained at the completion of the speed stage shifting.

BRIEF DESCRIPTION OF THE DRAWINGS

In the accompanying drawings.

DESCRIPTION OF THE PREFERRED EMBODIMENT

Figure 2:
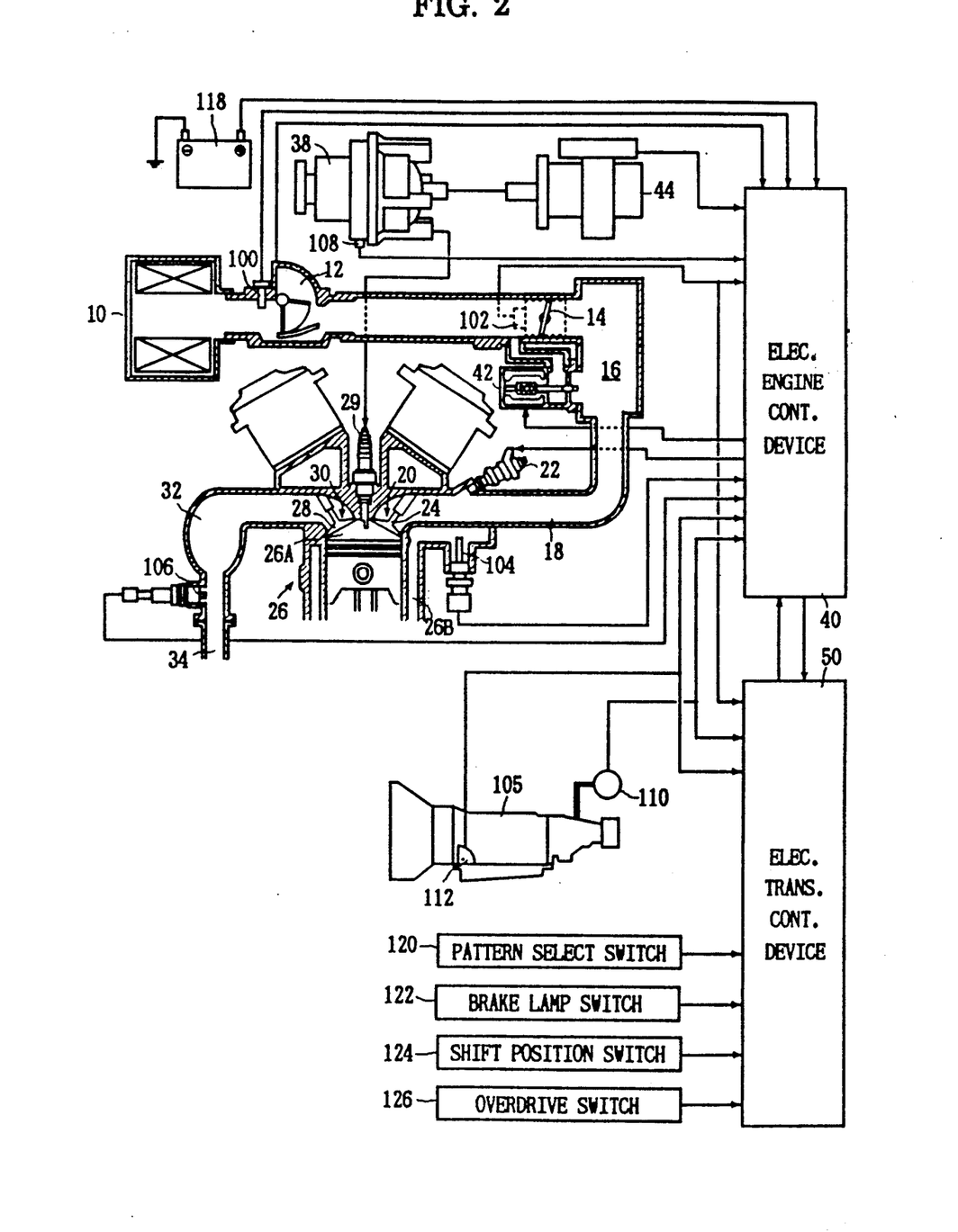
FIG. 2 is a diagrammatic illustration of a combination of an internal combustion engine and an automatic transmission with electronic control devices for the engine and the automatic transmission.

Referring to FIG. 2, the internal combustion engine herein shown, which may be controlled according to the method of the present invention in relation to a control of the automatic transmission also herein shown, comprises a cylinder-piston assembly 26 having a combustion chamber 26A adapted to be supplied with an intake fuel-air mixture from an intake port 20 provided with an intake valve 24, said intake fuel-air mixture being generated from intake air supplied through an intake system including an air cleaner 10, an air flow meter 12, a throttle valve 14, a surge tank 16, an idle controlling valve 42 for controlling an idling air passage bypassing the throttle valve 14, an intake manifold 18, fuel injected from a fuel injection valve 22 toward the intake port 20, and to exhaust combustion gases generated by the combustion of the fuel-air mixture through an exhaust port 30 provided with an exhaust valve 28 toward an exhaust system including an exhaust manifold 32 and an exhaust pipe 34. The combustion of the fuel-air mixture in the combustion chamber 26A is triggered by a spark plug 29 which is energized by an electric current supplied from an ignition coil 44 through a distributor 38. The temperature of the intake air is detected by an intake air temperature sensor 100, the temperature of engine cooling water in a water jacket 26B of the engine is detected by a cooling water temperature sensor 104, the oxygen content of the exhaust gases is detected by an oxygen sensor 106, the opening degree of the throttle valve 14 is detected by a throttle opening sensor 102, and the crank angle is detected by a crank angle sensor 108. The data obtained by these sensors are supplied to an electronic engine control device 40 which calculates engine control parameters based upon the data received from these sensors and dispatches control signals to the ignition coil 44, the fuel injection nozzle 22 and the idle control valve 42.

The automatic transmission designated by 105 is in fact mechanically connected with the engine having the cylinder-piston assembly 26 and is adapted to provide various speed stages under the control of an electronic transmission control device 50 which calculates transmission control parameters based upon data such as input rotational speed of an input rotational member of the transmission detected by a turbine speed sensor 112, output rotational speed of an output rotational member of the transmission which corresponds to vehicle speed and is therefore detected by a vehicle speed sensor 110, selection with regard to a plurality of shift patterns such as a power preference shift pattern and an economy preference shift pattern from a pattern select switch 120, stepping on and off of the brake from a brake lamp switch 122, shift position of shift position selection lever from a shift position switch 124, and on and off of the overdrive stage from an overdrive switch 126. The signals from the vehicle speed sensor 110 and the turbine speed sensor 112 are also supplied to the electronic engine control device 40 which is interconnected with the electronic transmission control device 50. Although the electronic engine control device 40 and the electronic transmission control device 50 are separated in the diagrammatic illustration in FIG. 2 for the convenience of separating control concepts for the engine and the transmission, these two electronic control devices may be in fact a single electronic computing unit. These electronic control devices are energized by a battery 118.

Figure 3:
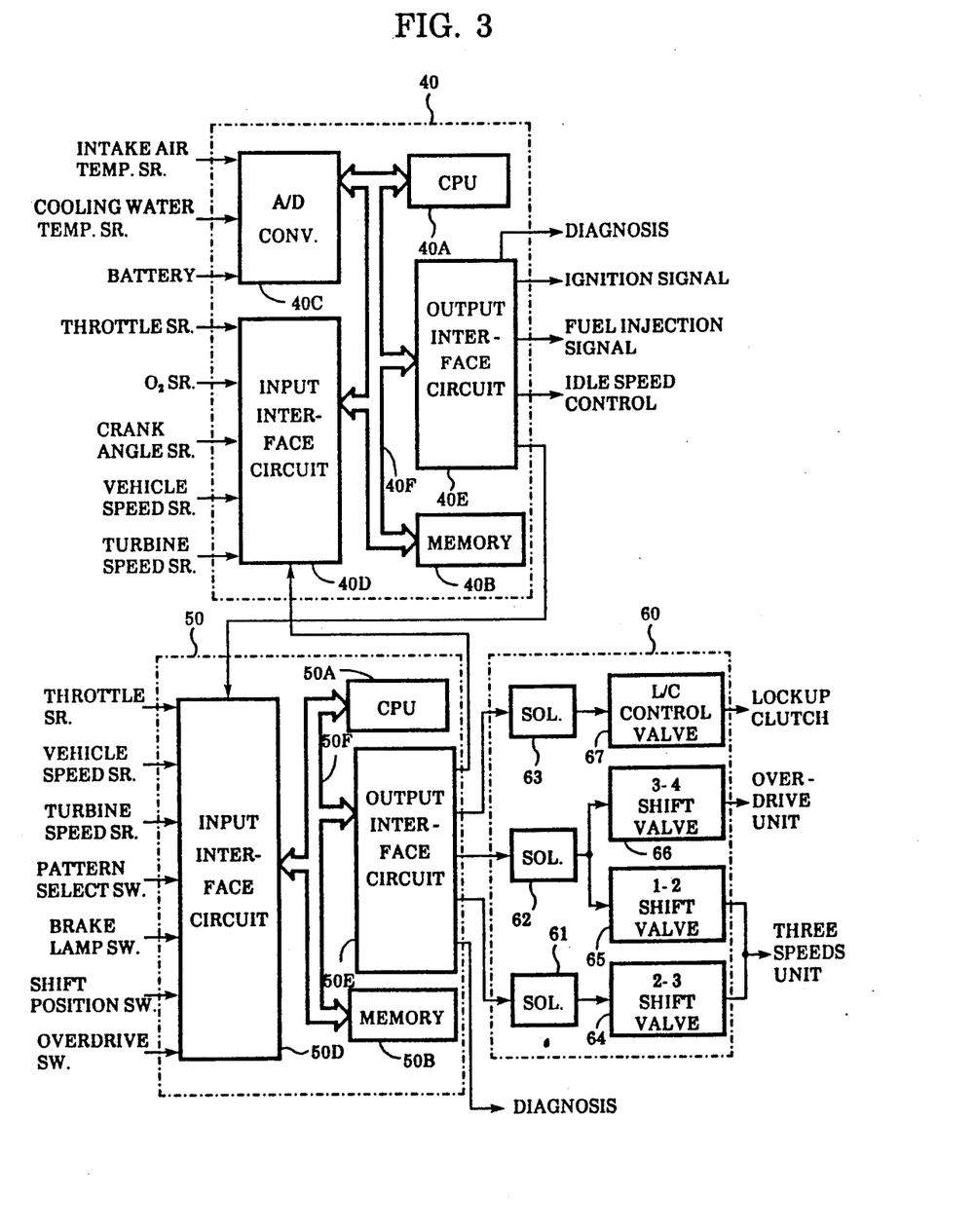
FIG. 3 is a diagrammatic illustration of the constructions of the electronic engine control device and the electronic transmission control device shown in FIG. 2.

The electronic engine control device 40 and the electronic transmission control device 50 are provided by an electronic computing system such as diagrammatically illustrated in FIG. 3. The electronic engine control device 40 includes a central processing unit 40A, a memory 40B including well known ROM and RAM, an analog-digital converter 40C, an input interface circuit 40D, an output interface circuit 40E and a common bus 40F interconnecting these functional units. The electronic engine control device 40 is supplied with inputs from the intake air temperature sensor 100, the cooling water temperature sensor 104 and the battery 118 shown in FIG. 2 through the analog-digital converter 40C and inputs from the throttle sensor 102, the oxygen sensor 106, the crank angle sensor 108, the vehicle speed sensor 110 and the turbine speed sensor 112 through the input interface circuit 40D from which engine control parameters in the central processing unit 40A, using other data and programs stored in the memory 40B, and outputs, through the output interface circuit 40E, control signals such as an ignition signal for controlling the spark timing by the spark plug 29, a fuel injection signal for controlling fuel injection by the fuel injection valve 22, and an idle speed control signal for controlling the idle control valve 42 as well as a diagnosis signal for the purpose of diagnosis.

Similarly, the electronic transmission control device 50 includes a central processing unit 50A, a memory 50B including ROM and RAM, an input interface circuit 50D, an output interface circuit 50E and a common bus 50F interconnecting these functional units. The electronic transmission control unit 50 receives data from the throttle sensor 102, the vehicle speed sensor 110, the turbine speed sensor 112, the pattern select switch 120, the brake lamp switch 122, the shift position switch 124 and the overdrive switch 126 through the input interface circuit 50D, calculates transmission control parameters in the central processing unit 50A based upon these data and certain data and programs stored in the memory 50B, and outputs control signals toward an electronic-hydraulic control circuit 60 including solenoid valves 61, 62 and 63, a 2-3 shift valve 64 adapted to be switched over according to the on and off status of solenoid valve 61, a 1-2 shift valve 65 and a 3-4 shift valve 66, both being adapted to be switched over according to the on and off status of the solenoid valve 62, and a lockup control valve 67 adapted to be switched over according to the on and off status of the solenoid valve 63. An electric-hydraulic control circuit of this type is shown in, for example, U.S. patent application Ser. No. 07/388,485.

Figure 4:
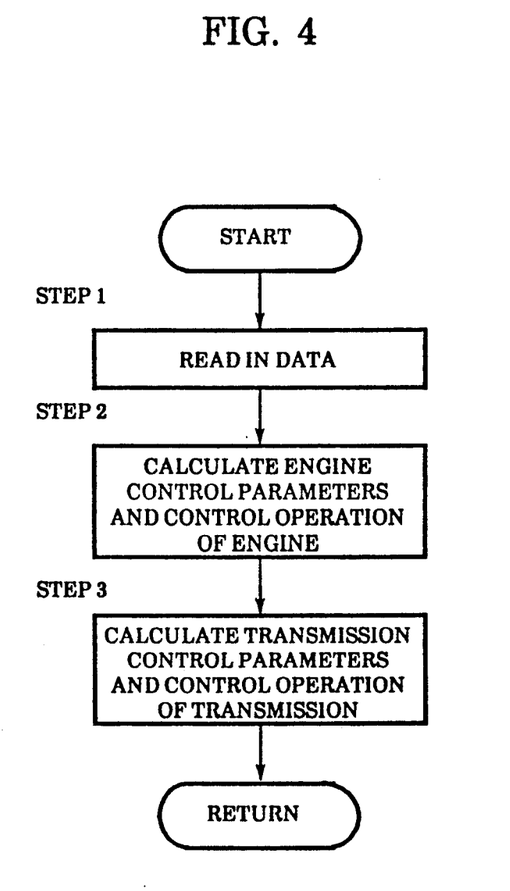
FIG. 4 is a flow chart showing the overall operation of the electronic engine and transmission control devices included in FIGS. 2 and 3.

The calculation of the engine control parameters and the control of operation of the engine as well as the calculation of the transmission control parameters and the control of operation of the automatic transmission by the electronic control devices as shown in FIG. 3 are carried out according to a control routine as shown by a flow chart in FIG. 4. As shown by the flow chart, when the control process is started in Step 1, data are read in. In Step 2, the engine control parameters are calculated based upon the read in data and the data and programs stored in the memory 40B and the operation of the engine is controlled according to the calculated control parameters. Then in Step 3, the transmission control parameters are calculated based upon the read in data and the data and programs stored in the memory 50B and the operation of the automatic transmission is controlled according to the calculated control parameters. These control processes are repeated at a small time interval on the order of several microseconds.

Figure 5:
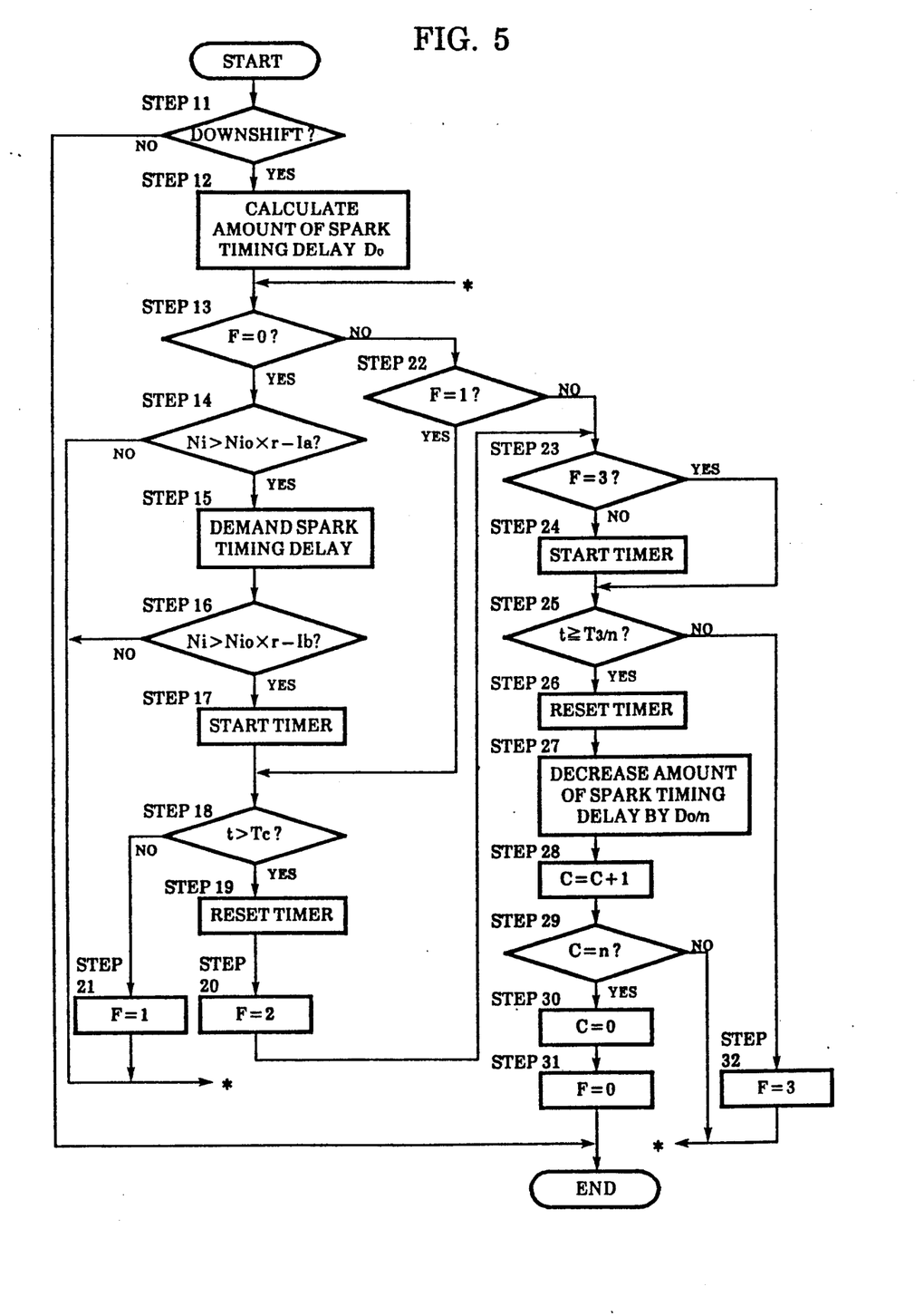
FIG. 5 is a flow chart showing a part of the control operation performed by the electronic engine and transmission control devices in accordance with a subroutine for temporarily decreasing the engine output torque during a speed stage shifting of the automatic transmission according an embodiment of the present invention.

In a part of the control operation carried out in Step 2 of the flow chart shown in FIG. 4, as a subroutine of the control process, a series of control processes, such as shown by the flow chart of FIG. 5, are carried out according to the present invention. When this subroutine is started in Step 11, it is judged if a downshifting instruction from a certain higher speed stage to a certain lower speed stage was provided to the electric-hydraulic control circuit 60. If the answer is yes, the process proceeds to Step 12, and if the answer is no, the process proceeds to End with no further prosecution of the succeeding processes. In Step 12, the spark timing delay D0 is calculated (FIG. 1) based upon various engine operating parameters. Then the process proceeds to Step 13, where it is determined if a flag F is zero. If the answer is yes the process proceeds to Step 14.

In Step 14, it is determined if the input rotational speed Ni of the transmission, detected by the turbine speed sensor 112, is larger than Ni0×r−Ia, wherein Ni0 is the starting value of the input rotational speed at the time of starting the downshifting, r is the ratio of increase of the input rotational speed of the transmission due to the downshifting and Ia is the difference in rotational speed corresponding to Ia in the diagram of FIG. 1. If the answer is yes, the process proceeds to Step 15, and the spark timing delay demand signal is dispatched as described with reference to FIG. 1. Then after a time lapse such as T$_1$ in the diagram of FIG. 1, the delay of ignition timing is virtually started. If the answer in Step 14 is no, the process returns to Step 13.

After the spark timing delay was demanded in Step 15, the process proceeds to Step 16, and it is judged if the input rotational speed Ni is larger than Ni0×r−Ib, wherein Ib corresponds to Ib in the diagram shown in FIG. 1. If the answer is yes, the process proceeds to Step 17, and a timer for counting the time duration Tc in the diagram shown in FIG. 1 is started. If the answer in Step 16 is no, the process returns to Step 13.

After the timer is started in Step 17, the process proceeds to Step 18, and it is judged if the time t counted by the timer is larger than Tc. If the answer is yes the process proceeds to Step 19 and the timer is reset and then in Step 20 the flag F is set to 2. If the answer in Step 18 is no, the process proceeds to Step 21, the flag F is set to 1, and the process returns to Step 13.

Going back to Step 13, if the answer in Step 13 is no, the process proceeds to Step 22, and it is judged if the flag F is 1. As described hereinunder the flag F is always set at 0 when this subroutine is newly started. Therefore, when the process reached Step 13 for the first time, the process proceeds to Step 14, but when the Step 17 is once traversed, i.e. when the timer is started, at Step 18, the process proceeds to Step 21 to set the flag F to 1 until the timer counts the time lapse Tc. Therefore, the subsequent processes which reach Step 13 are always diverted to Step 22, wherein it is checked if the flag F is 1, and if the answer is yes the process proceeds to Step 18, so that when the counting for the time duration Tc has once started, the time counting is kept on until the time duration Tc is counted.

When the time lapse Tc is counted by the timer, and the process has proceeded through Steps 19 and 20 as described above, the process proceeds to Step 23, and it is judged if the flag F is 3. When the process reaches Step 23 for the first time, the flag is not set to 3, and therefore in the first pass the answer is definitely no and the process proceeds to Step 24, and the timer is again started. Then the process proceeds to Step 25, and it is judged if the time counted by the timer is equal to or larger than T$_3$/n, wherein T$_3$ corresponds to T$_3$ in the diagram of FIG. 1 and n is a certain integer representing a number of steps for steppedly cancelling the delay of spark timing. If the answer in Step 25 is yes, the process proceeds to Step 26, and the timer is reset, and then the process proceeds to Step 27 and the amount of spark timing delay is decreased as much as D0/n. Then the process proceeds to Step 28, and count number C of a counter is increased by one and the process proceeds to Step 29. In Step 29, it is judged if the count number C is n, and if the answer is yes, the process proceeds to Step 30 to reset the count number C to zero, to Step 31 to set the flag F to zero and then process proceeds to End.

Going back to the Step 25, if the answer is no, the process proceeds to Step 32 and the flag F is set to 3 and the process proceeds to Step 13. Back in Step 23, if the answer is yes, the process proceeds to Step 25 while bypassing Step 24. Thus it will be understood that the spark timing delay of the amount of D0 is steppedly cancelled toward zero in the time $T_3$ by the steps of n times through the process of Steps 23-32.

Thus, when the process has once traversed Step 15 the delay of spark timing is triggered so that the spark timing delay is virtually started from the time point which is delayed from the time point $t_a$ as much as the time lapse $T_1$, and the delay of the spark timing by the amount D0 is continued until the time duration $Tc + T_1'$ lapses from the time point $t_b$. Each time a time duration of $T_3/n$ lapses, the amount of spark time delay is decreased by the amount of $D0/n$ for n times until the spark timing delay is totally cancelled. Of course it is not essential for the present invention that the delay of spark timing be steppedly cancelled. The delay of spark timing may be continuously, gradually cancelled or may be immediately cancelled when the time duration Tc has lapsed.

Although the invention has been described in detail with respect to a preferred embodiment thereof, it will be understood by those skilled in the art that various modifications are possible with respect to the shown embodiment without departing from the spirit of the present invention.

We claim:

1. A method of controlling an internal combustion engine in a vehicle in relation to a control of an automatic transmission in the vehicle, comprising the steps, when said automatic transmission is shifted between two speed stages, of:

monitoring input rotational speed of said automatic transmission so as to detect first and second predetermined values thereof along with change of said input rotational speed due to the speed stage shifting of said automatic transmission so as to dispatch first and second signals corresponding to traversing of said first and second values, respectively;

starting a first control operation for the engine to decrease output torque thereof in response to said first signal;

starting a time counting in response to said second signal; and starting a second control operation for the engine in response to a predetermined counting of time by said time counting to regain the output torque thereof by canceling the decrease of output torque thereof due to said first control operation.

2. A method according to claim 1, wherein said first predetermined value of said input rotational speed is selected to provide said first signal early enough to allow said first control operation to bring about a substantial decrease of the engine output torque before the speed stage shifting is completed in spite of probable variations in a rate of change of said input rotational speed due to the speed stage shifting.

3. A method according to claim 1, wherein said second predetermined value of said input rotational speed is selected to be substantially different from said first predetermined value and to be closer to a final value of said input rotational speed which is attained at the completion of the speed stage shifting.

4. A method according to claim 1, wherein the automatic transmission is controlled for the speed stage shifting by a first microcomputer system, and the engine is controlled for said first and second control operations by a second microcomputer system, said second microcomputer system being subject to instructions of said first microcomputer system with regard to the decreasing of output torque of the engine in response to the speed stage shifting of the automatic transmission.

* * * * *